United States Patent [19]

Steinke et al.

[11] Patent Number: 5,073,429
[45] Date of Patent: Dec. 17, 1991

[54] DOOR PANEL

[75] Inventors: David M. Steinke, Baltimore; Michael Blankenship, Pataskala; Marshall G. Satterfield, Johnstown; Philip D. Gardner, Sr., Findlay, all of Ohio

[73] Assignee: Process Bonding, Inc., Johnstown, Ohio

[21] Appl. No.: 655,057

[22] Filed: Feb. 14, 1991

Related U.S. Application Data

[62] Division of Ser. No. 439,172, Nov. 20, 1989, Pat. No. 4,996,090.

[51] Int. Cl.⁵ .............................................. B32B 3/26
[52] U.S. Cl. ..................................... 428/71; 156/213; 156/245; 428/157; 428/159; 428/308.4; 428/309.9; 428/316.6; 428/317.1; 428/317.7
[58] Field of Search ................ 156/213, 245; 428/157, 428/159, 308.4, 309.9, 316.6, 317.1, 317.7

[56] References Cited

U.S. PATENT DOCUMENTS

| | | | |
|---|---|---|---|
| 3,075,862 | 5/1963 | Hoyer | 428/130 |
| 3,230,064 | 6/1966 | Smith | 156/222 |
| 3,355,345 | 1/1967 | Braun | 156/380 |
| 3,466,214 | 1/1969 | Polk et al. | 156/213 |
| 3,520,755 | 8/1970 | Scholl et al. | 156/380 |
| 3,655,477 | 6/1972 | Scholl et al. | 156/202 |
| 4,327,049 | 4/1982 | Miller | 428/316.6 |
| 4,350,734 | 12/1982 | Hammond | 428/308.4 |
| 4,476,183 | 10/1984 | Holtrop et al. | 428/316.6 |
| 4,544,595 | 10/1985 | Tomason | 428/316.6 |
| 4,729,917 | 3/1988 | Symdra et al. | 428/316.6 |

Primary Examiner—William J. Van Balen
Attorney, Agent, or Firm—Sidney W. Millard

[57] ABSTRACT

A panel formed as a laminate with a decorative fabric at the exposed face includes a pair of foamed resin layers as backing material. Between the foamed resin layers is a fiber glass layer for strength. Means are provided to attach the panel to a substrate.

20 Claims, 2 Drawing Sheets

DOOR PANEL

This is a division of application Ser. No. 439,172, filed Nov. 20, 1989, now U.S. Pat. No. 4,996,090.

FIELD OF THE INVENTION

This invention relates to decorative panels formed from polyurethane foam, fiber glass and a decorative layer at the exposed face. At least one use is a panel for mounting on the inside surface of an automobile door.

BACKGROUND OF THE INVENTION

Current construction of automobile doors includes a plastic shell with various openings for door lock connections, electric window control buttons, ash trays, door handles and the like. To enhance the decorative appearance of the inside of doors which incorporate the plastic shell a decorative, fabric covered panel is adhered to the inside of the door. The current way to attach the decorative panel to the door is by way of "toy tabs" which are well known in the industry. Toy tabs are tabs or prongs struck from a metal sheet, the tabs are to project through holes in a substrate and be deformed to one side to lock the metal sheet to the substrate.

The way the toy tab structure is affixed to the decorative panel is by a bonding of the metallic layer at the unexposed face of the panel with the rearwardly projecting tabs pre-cut for later manipulation.

The decorative panels themselves are a sandwich of various materials including the aforementioned decorative layer on the front and the metallic layer bonded to the back.

U.S. Pat. No. 3,234,064 to Smith and U.S. Pat. Nos. 3,520,755 and 3,655,477 to Scholl et al show the manufacture of a composite piece of foamed materials and non-foamed covers to form a panel.

U.S. Pat. No. 3,466,214 to Polk et al illustrates a way of forming a panel from composite material in a mold with the edge or ridge around the mold including a sharp cutting edge which cuts the product to the desired shape, note particularly FIG. 4. Similar structure in slightly modified form is illustrated in U.S. Pat. No. 3,075,862 to Hoyer.

U.S. Pat. No. 3,355,345 to Braun illustrates a mold in FIG. 6 which shows a plurality of product molds on one sheet to be used in a press.

U.S. Pat. No. 4,350,734 to Hammond illustrates a composite structure forming a rigid panel which uses one or more layers of open celled polyurethane foam in forming the panel.

It is noted that none of these cited patents includes a metal sheet as the back layer of the laminated panel.

The conventional door panel using the metal backing layer has many defects from a manufacturing and efficiency standpoint One problem is that once the metallic backing layer becomes deformed it never quite fits or looks quite right when reshaped to a planar surface Therefore, in the manufacturing and shipping of the panels it is critical that they be shipped so that a bend is not applied to the panel.

Another defect is the tab connection between the plastic door shell and the decorative panel. In order to be properly manipulable by the workman, the tabs projecting from the metal layer must not be too stiff. Conversely, in order that the door panel not work loose as a result of hundreds of door openings and closings, the tabs cannot be too flexible. A balance must be struck but it is inherent that the balance will not always work under all circumstances What is needed is a panel of sufficient rigidity as to serve the purpose of the door panel, which will not have a crease problem upon bending and which will not be subject to thermal expansion and contraction problems nor flexing problems from door openings and closings which could result in the separation of the panel from the plastic door shell While the above discussion has been directed specifically to automobile door panels, it will be quite obvious that the panels described previously and subsequently are not at all limited to automobile doors.

SUMMARY OF THE INVENTION

To solve the problem in the industry relating to the metallic layer and the toy tab structure, this invention includes alternative attaching means. One such attaching means is a double sided adhesive tape mounted in place of the metallic layer of conventional panels. Another alternative way of mounting the panel is by substituting a CHRISTMAS TREE structure in the form of a plastic stud having a head on one end and radially extending flanges along its shaft. The stud or studs to be mounted in the panel will project radially from the backside and are designed to project through an aperture in the substrate, which aperture will be smaller in cross-sectional area than that of the flanges on the shaft of the stud. Thereby, when the stud is pushed through the hole, the flanges will deflect and spring back on the other side of the hole to hold the panel in contact with the substrate.

The panel itself includes a decorative layer on the front or exposed side which in some cases may be a woven fabric. Immediately behind the decorative front layer are two layers of open celled polyurethane foam and sandwiched between the foam layers is a bat of spun fiber glass. The fiber glass gives the panel tensile strength in all directions and dimensional stability.

The foamed polyurethane is impregnated with a suitable adhesive in an amount sufficient to fill the cells of the foam when the foam is compressed into the desired shape and thickness during the molding process. Thereby, the foamed resin of both layers will be relatively hard when the adhesive is cured but flexible enough to provide both good dimensional stability and easy manipulation into the desired location.

The panel itself is manufactured by assembling the layer between a pair of molds which then compress and heat the laminated structure to cure the adhesive For manufacturing efficiency, the mold surfaces are vertically spaced and the lower mold surface includes the outline of a plurality of the desired shape for the panel. The shape on the lower surface will be outlined by an upstanding ridge traversing the periphery of the desired panel shape. The upper most extent of the ridge is a knife edge designed to cut the panel to shape. The cutting is accomplished after the molds are pressed together and heated as necessary to cure the adhesive used in the bonding of the layers After the upper mold surface has performed its function it is removed and the lower mold surface with the cured panel thereon is fed through a pair of rollers which will cooperate with the knife edge of the ridge around the desired panels to cut the panel to the desired shape. Thereafter the excess material outside the ridge is stripped away and the plurality of panels of the desired shape are extracted for packaging and shipment to an appropriate manufacturer.

Objects of the invention not clear from the above will be understood fully by a review of the drawings and the description of the preferred embodiment which follows.

DESCRIPTION OF THE PREFERRED EMBODIMENTS

Figure 1:
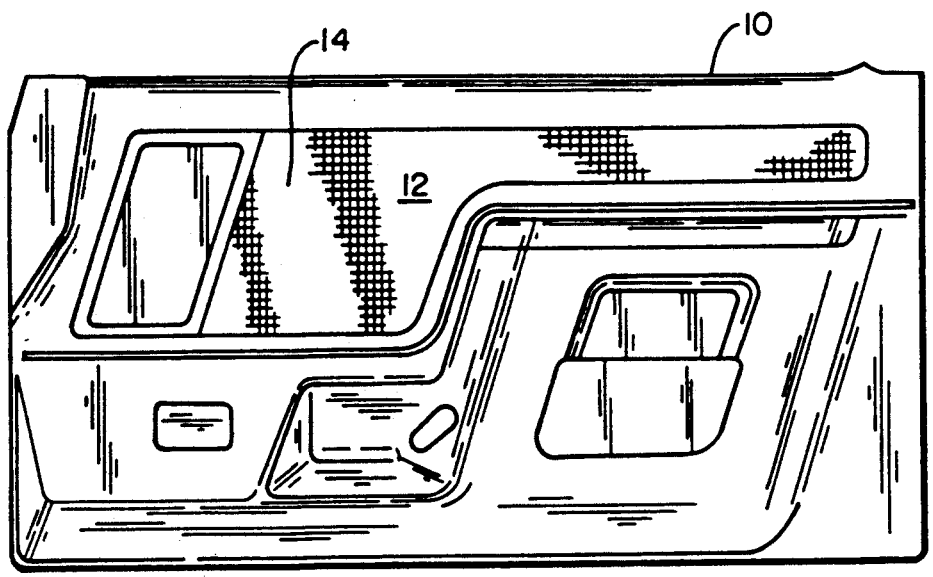
FIG. 1 shows a decorative panel according to this invention mounted on the inside surface of an automobile door.

FIG. 1 illustrates a plastic shell or substrate 10 which serves as the inside surface of a vehicle door, seat for a chair or the like and mounted thereon is a panel 12 which serves as a soft and decorative feature of the door interior or otherwise surface.

The panel 12 itself is a composite of a plurality of layers of material bonded together by an appropriate adhesive. The visible or exposed surface is a decorative layer 14 which may be a woven fabric, embossed polymer or other material.

Figure 2:
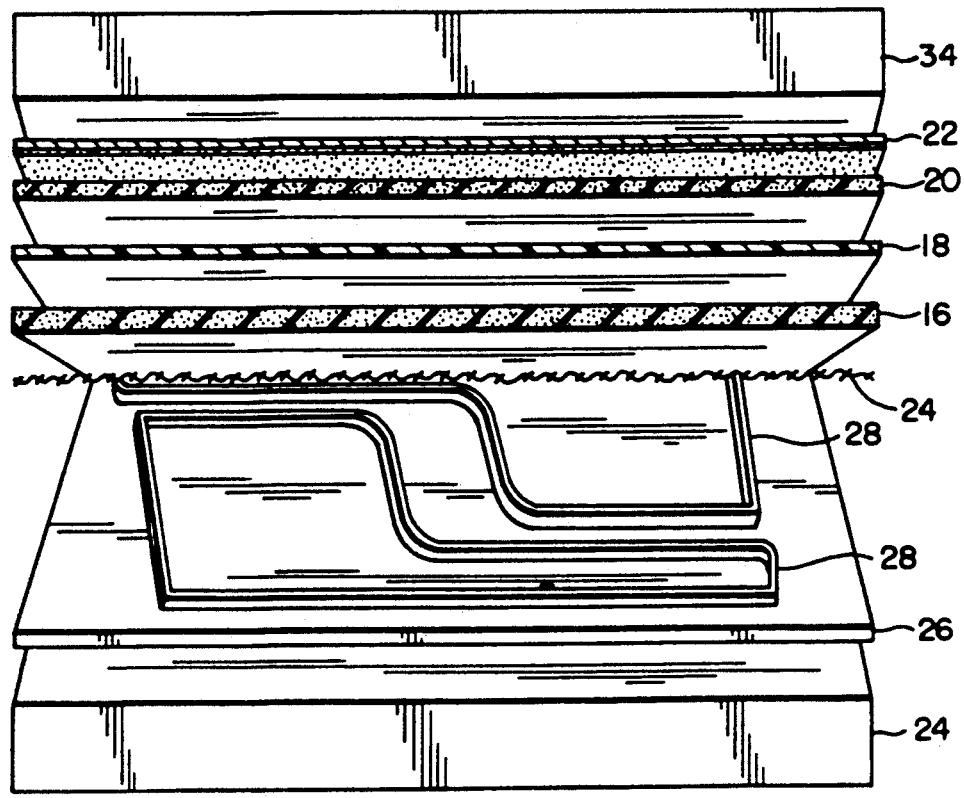
FIG. 2 is an exploded elevational view showing the molding process and the layers of the panel in superposed position.
Figure 3:
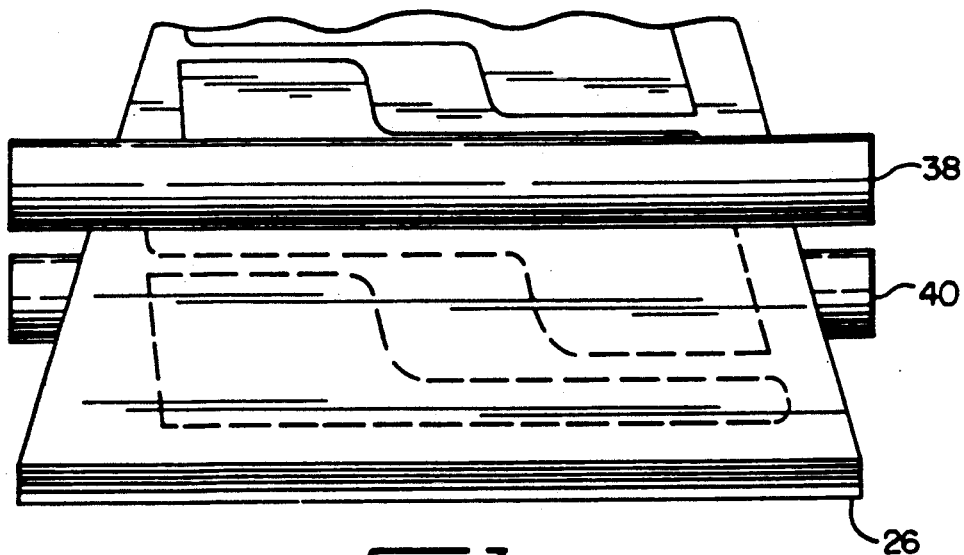
FIG. 3 is a perspective view of the cured panel and lower mold surface passing through a pair of rollers to cut the panel to shape.

FIG. 2 illustrates the sequence in which the various layers of the laminate are assembled. Adjacent to the decorative layer 14 is a foamed polyurethane layer 16 which is of open celled structure and preferably about one-half inch thick. The foam itself has a density of about 1.2 lbs/cubic foot and a suitable source of the material is Burkhart Foam, Burkhart, Indiana. The preferred foam has an industry deflection designation of 60ILD.

Adjacent the foamed resin layer 16 is a thin layer 18 of spun fiber glass which serves to give dimensional stability and tensile strength to the panel since the spun fibers are randomly oriented.

The next layer 20 is an open celled polyurethane foam layer having identical dimensions and characteristics as layer 16.

The back layer which will be in direct contact with the plastic door shell 10 is a double sided adhesive tape 22. The preferred tape may be obtained from Avery under the trademark FASTAPE 1125 HX and is an acrylic pressure sensitive adhesive on a polyethylene coated natural craft release liner or peel sheet. One side of the pressure sensitive adhesive is applied directly to the surface of foamed urethane layer 20. The craft paper peel sheet covers the other surface of the pressure sensitive adhesive and will be stripped away at the time the workman desires to apply the panel 12 to the plastic shell 10.

In the manufacturing process the layers of the panel are stacked one above the other on top of a lower mold 24. The structure shown in FIG. 2 indicates that the lower mold surface is of two parts and the second 26 of the parts includes a plurality of panel shapes bordered by a ridge 28.

Figure 4:
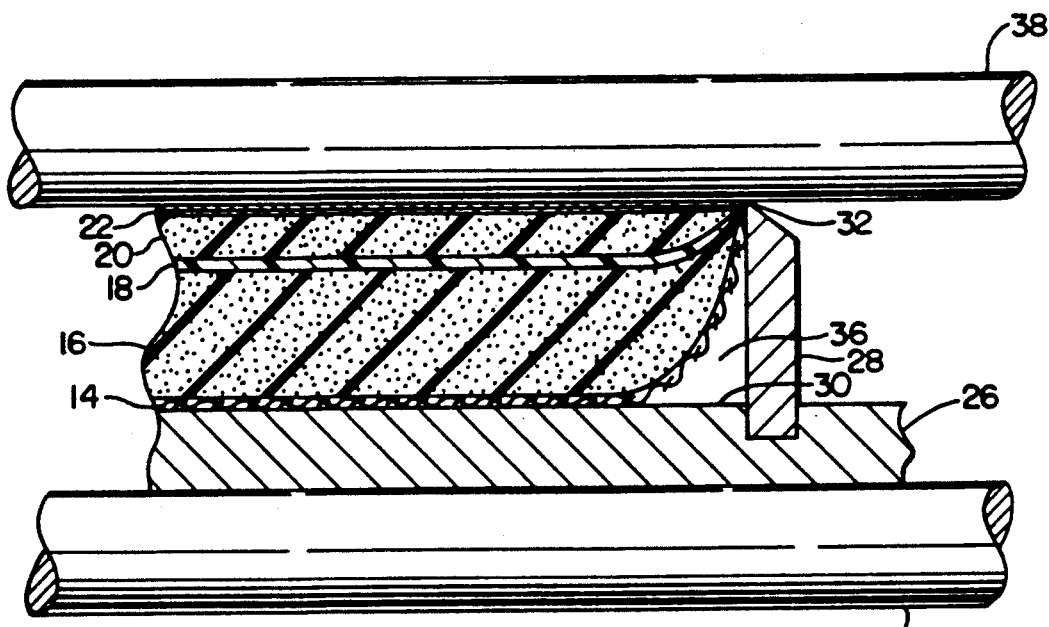
FIG. 4 is a fragmentary sectional view of the rollers, panel and lower mold surface as the rollers cut the panel to shape.

As best seen in FIG. 4 the shape defined by ridge 28 includes a central portion of generally planar surface 30 and the ridge 28 extends generally perpendicular to planar surface 30. The upper edge of the ridge terminates in a sharp knife edge 32 and its function will be explained subsequently.

Prior to the assembly of the two polyurethane foamed layers 16 and 20 and the fiber glass layer 18, each layer is impregnated with a suitable amount of a particular adhesive which is heat and moisture curable. The adhesive is applied by conventional apparatus known in the industry and in an thane when the upper section 34 of the press is moved into operative position. Note that the thickness of the foam layers 16 and 20 in FIGS. 4 and 5 appear to be different and indeed they may be different. The layers could be initially one-quarter inch thick or one-half inch thick or anyplace in between depending upon the desired thickness and ultimate structure of the finished panel In a panel designed for a door similar to that illustrated in FIG. 1, the ridge 28 will rise less than about one-half inch and preferably about one-quarter inch above planar surface 30, thereby, when molds 24 and 34 are pressed together there will be substantial compression of the foamed resin and therefore a great amount of adhesive is not required to fill the voids of the compressed urethane.

The thickness of the foam layers may be greater or smaller than that specified for a door panel if circumstances dictate.

The adhesive mixture preferred is about two-thirds polyether polyol, preferably in the range of about 60-75% by volume, to about one-third aromatic isocyanate by volume with an appropriate catalyst, although the volume of isocyanate could range from about 25-40%.

Useful are polyether polyols with the preferred polyol being a hydroxyl terminated poly(oxyalkylene) polyol, of appropriate molecular weight, such as obtainable from Mobay Corporation under the trademarks MULTRANOL 3900 (mol. wt. about 4800) and MULTRANOL 9157. Such polyether polyols may be used singularly or in admixture in the adhesive mixture.

The preferred isocyanate is a polymethylenepolyphenylene ester of isocyanate acid, such as obtainable from Mobay Corporation under the trade designation MONDUR MR, whose composition consists essentially of about 45-55% of diphenylmethane diisocyanate (MDI), about 45-55% of higher oligomers of MDI, and a trace of phenyl isocyanate.

Suitable catalysts are available from Air Products and Chemicals, Inc. under the trade designation DABCO T-12 (a specially formulated high-boiling liquid dibutyltin dilaurate) or DABCO 33 LV which is a triethylenediamine (TEDA) catalyst and particularly 1,4-diazobicyclo (2.2.2) octane. The proportions of catalyst needed may vary, depending upon curing temperature, relative humidity of the air and other factors known in the industry. By way of preferred example, in the above stated environmental conditions, about one and one-half grams of triethylenediamine are added to each gallon of polyol and followed by about three-fourth gram of the dibutyltin dilaurate being added to each gallon of polyol. Preferably the catalysts are added to the polyol prior to its mixture with the isocyanate.

While we have described the preferred embodiment with a particular polyol, isocyanate and catalyst, it will be clear that the time periods and the temperatures for curing could be modified by adjustment of the catalyst and other perimeters and these would be obvious modifications well within the inventive concept. Similarly, the curing time might be reduced for the liquid resin adhesive by a controlled increase in the humidity in the vicinity of the furnace.

The age of the foam in the panel should not exceed about thirty days at the time the panel is formed.

Another feature of the particular mold structure of this invention is best seen in FIG. 4 and to understand its significance one must be aware of the conventional way of making decorative door panels using the rear metallic layer to provide the toy tabs. The conventional way to make the panel is to first make the composite layer. Then apply the decorative front layer and pull the edges of the decorative layer around to the backside of the panel where it is held in place by tacks, adhesive, staples or some other mechanism. This invention avoids the need for, such complications by a "flush cut" technique It involves the way the panel shape is severed after the adhesive is cured.

In the initial assembly of the panel layers the decorative layer 14 is first deposited Each piece of the decorative layer is cut somewhat to size because of the cost of the material. One of the cut decorative fabric layers 14 is applied over each of the ridges 28 and each cut piece of fabric 14 extends beyond the ridge 28. That is, the preliminarily cut fabric pattern is larger than the shape defined by the ridge 28. It is allowed to rest in place and conform by gravity to the shape defined by the ridge 28, then the adhesive impregnated layers 16, 18 and 20 are applied. They are not cut to size because of the cost, they extend substantially the full width and length of the mold 26. Last, the double sided adhesive tape layer 22 is applied, it too extends for the full dimensional width and length of mold 26.

Looking now to FIG. 4, it will be observed that fabric layer 14 lies substantially flat on planar surface 30 except near the edges of the panel at ridge 28. The decorative layer 14 defines a convex shape curving back toward the rear surface of the panel. Note also that there is a space 36 formed between planar surface 30, ridge 28 and decorative layer 14. Space 36 allows for expansion of the foamed resin and accommodation by the slightly stretchable fabric layer 14 during the manufacturing process.

To the average consumer the panel of this invention will look the same as other panels he is used to seeing That is intentional. The invention is not in its appearance when installed. The invention is in the panel structure behind the fabric, the way it is made and the way it is installed Observing again FIG. 4, it will be clear what a casual observer of the panel 12 will see when he views it from the vantage point of FIG. 1. He will see the panel of this invention which appears to have the fabric extending over and around the peripheral edges of the panel, the same as prior panels In fact it does not extend around the edge, it is "flush cut" to give that appearance, it is only molded and cured to shape to give the decorative appearance but without the extra work When mold sections 24 and 34 are pressed together to mold the panels of this invention, they are heated to cure the adhesive impregnating the foamed resin and fiber glass layers. The adhesive is designed to cure at above 200° F. As a consequence the lower mold surfaces are not intentionally heated above about 150° F. because the mold tends to hold heat during the manufacturing process going from one step to the other, and if it gets above about 150° F. it may tend to cook the adhesive during the assembly process. The upper section 34 of the mold will be heated to about 250° F.

The pressure applied to the molds is about 5-50 tons on a mold having a cross-sectional area of about five feet by four feet having about nine of the panel shapes defined by ridge 28 on the surface. The lineal length of each of the ridges is about sixty-five inches. While the indicated range of pressures is satisfactory the preferred pressure applied to the mold surfaces is about 35 tons and the time period in the heating furnace at the indicated temperatures is about 2 ¼ minutes. The time period may be increased or decreased depending upon the exact temperature used, the moisture content of the air which is an inherent ingredient in the curing of the adhesive, and the catalyst used.

Figure 5:
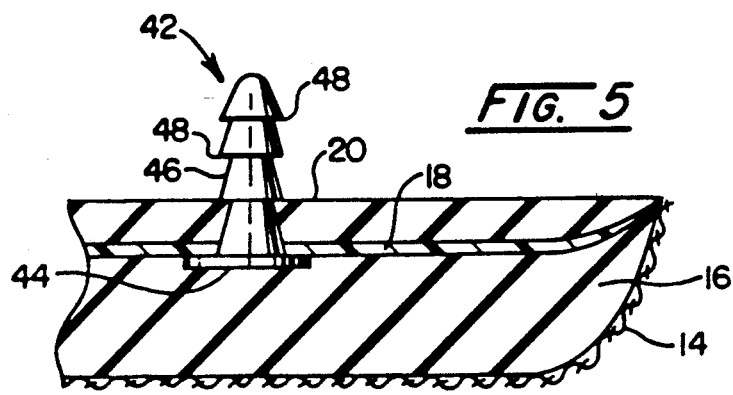
FIG. 5 is a fragmentary sectional view similar to FIG. 4 of an alternative embodiment to the panel attaching means of this invention.

After the appropriate temperature is achieved and curing times have been completed, the mold is removed from the furnace and the upper mold retracted to an out of the way position. In this instance, the mold section 26 and the cured composite are moved to a cooling section and then fed through a pair of pinch rollers 38, 40 which will serve to cut the overlap of the panels at the knife edge 32 of ridge 28. The scrap material may then be stripped and discarded and the formed panels may be collected as ready for assembly or shipment to an appropriate assembly facility FIG. 5 shows another embodiment for attaching the panel 12 to the substrate 10. It includes a CHRISTMAS TREE structure 42 comprising a resin stud having a head 44 on one end of a shaft 46 and along the shaft are a plurality of radially extending flanges 48. The CHRISTMAS TREE is designed to project through a hole in substrate 10 where the hole has a smaller cross-sectional area than the flanges 48. The flanges are designed to deflect toward the head 44 as they pass through the hole under pressure applied against the head 44 from the fabric side of the panel. After the flanges pass through the hole they will deflect radially and then will hold the panel tightly against the substrate The head 44 is located between the fiber glass layer 18 and first foamed layer 16; the fiber glass helps prevent the stud from being pulled from the panel.

It will be understood that in the manufacturing process using the CHRISTMAS TREE illustrated in FIG. 5 suitable holes would be required in the bottom surface of mold section 34 to accommodate the studs 42. Similarly annular grooves in roller 38 would be required for the same reason.

Having thus described the invention in its preferred embodiment, it will be clear that other modifications may be made without departing from the spirit of the invention. Also the language used to describe the inventive concept and the drawings accompanying the application to illustrate the same are not intended to be limiting on the invention rather it is intended that the invention be limited only by the scope of the appended claims

We claim:

1. A composite panel comprising, a series of layers bonded together having two faces and an edge periphery,
   one face comprising a layer of decorative material, adjacent said periphery said decorative material curing toward a second face to define a convex surface terminating at said periphery,
   said decorative material being bonded to one side of a first foamed resin layer by an adhesive at least partially impregnating said foam, said foam being open celled means adhered to said composite panel for connecting the panel to a substrate and the periphery of said panel being compressed to a minimal thickness with the decorative material terminating substantially at said second face.

2. The panel of claim 1 wherein the adhesive impregnating said foamed layer is a mixture of about 60–75% polyol, 25–40% isocyanate and a catalyst.

3. The panel of claim 2 wherein the means adhered to said composite panel for connecting the panel to a substrate comprises at least one flanged resin stud having a shaft with a head on one end, said head being located between said first foam layer and said decorative layer, the shaft of the stud bearing the flange extending through the foamed layer and beyond for a distance great enough to allow the shaft and flange to project through a hole in said substrate, said hole having a cross-section smaller than said flange passing therethrough, said flange being flexible to the extent that it will (1) deform to pass through the hole upon sufficient pressure being applied in the area of the head and (2) spring back into position to hold the second face of the panel against the substrate.

4. The panel of claim 2 wherein the means adhered to said composite panel for connecting the panel to a substrate comprises a pressure sensitive double sided adhesive tape, one side of said adhesive tape being bonded to one side of said foamed layer, the other side of said adhesive tape being covered with a peel strip.

5. The panel of claim 1 wherein the means adhered to said composite panel for connecting the panel to a substrate comprises a pressure sensitive double sided adhesive tape, one side of said adhesive tape being bonded to one side of said foamed layer, the other side of said adhesive tape being covered with a peel strip.

6. The panel of claim 1 wherein the means adhered to said composite panel for connecting the panel to a substrate comprises at least one flanged resin stud having a shaft with a head on one end, said head being located between said first foam layer and said decorative layer, the shaft of the stud bearing the flange extending through the foamed layer and beyond for a distance great enough to allow the shaft and flange to project through a hole in said substrate, said hole having a cross-section smaller than said flange passing therethrough, said flange being flexible to the extent that it will (1 deform to pass through the hole upon sufficient pressure being applied in the area of the head and (2) spring back into position to hold the second face of the panel against the substrate.

7. A process for forming a panel comprising,
providing a mold having upper and lower sections, the upper section having a first planar surface facing the lower section, the lower section including a second planar section, providing a border ridge around the second planar section, said ridge projecting toward said upper mold section and including a sharp cutting edge at its upper most edge which extends around the second planar surface, the height of said ridge being less than abut one-half inch above the second planar section, providing a decorative layer to provide one face for said panel, cutting the decorative layer to about the shape defined by said sharp edge, placing the decorative layer on the lower mold in a position that the decorative layer covers the sharp edge and extends beyond said sharp edge at all locations, providing a first layer of open celled foamed resin of a thickness in the range of about ¼–½ inches, impregnating the foamed layer with an adhesive in an amount which will fill the cells upon compression to the desired thickness of the cured panel, placing the first layer of foam over the decorative layer in a manner to completely cover the decorative layer, pressing the two mold sections together to compress the layers between the planar sections and at the sharp ridge edge, heating the lower mold section to about 150° F. and the upper mold section to about 250° F. for a period of time adequate to cure the adhesive.

8. The process of claim 7 further including, after the adhesive is cured, removing the upper mold section and running the lower mold section and cured panel between a pair of compression rollers to cut the panel at the sharp ridge edge.

9. The process of claim 8 including, before pressing the two mold sections together, applying means to said panel for connecting the panel to a substrate.

10. The process of claim 9 wherein the connecting means comprises at least one flanged resin stud having a shaft with a head on one end, said head being located between said first foam layer and said decorative layer, the shaft of the stud bearing the flange extending through the foamed layer and beyond for a distance great enough to allow the shaft and flange to project through a hole in said substrate, said hole having a cross-section smaller than said flange passing therethrough, said flange being flexible to the extent that they will (1) deform to pass through the hole upon sufficient pressure being applied in the area of the head and (2) spring back into position to hold the second face of the panel against the substrate.

11. The process of claim 9 wherein the connecting means comprises a layer of double sided pressure sensitive adhesive tape, placing a layer of said adhesive tape over the layer of foam, one side of said tape adhesively bondable to said layer of foamed resin, the other side of said adhesive tape facing the planar surface of the upper mold section being covered with a peel strip, the adhesive tape being of a size to cover the layer of foamed resin.

12. The process of claim 7 including, before pressing the two mold sections together, applying means to said panel for connecting the panel to a substrate.

13. The process of claim 12 wherein the connecting means comprises at least one flanged resin stud having a shaft with a head on one end, said head being located between said first foam layer and said decorative layer, the shaft of the stud bearing the flange extending through the foamed layer and beyond for a distance great enough to allow the shaft and flange to project through a hole in said substrate, said hole having a cross-section smaller than said flange passing therethrough, said flange being flexible to the extent that they will (1) deform to pass through the hole upon sufficient pressure being applied in the area of the head and (2) spring back into position to hold the second face of the panel against the substrate.

14. The process of claim 12 wherein the connecting means comprises a layer of double sided pressure sensitive adhesive tape, placing a layer of said adhesive tape over the layer of foam, one side of said tape adhesively bondable to said layer of foamed resin, the other side of said adhesive tape facing the planar surface of the upper mold section being covered with a peel strip, the adhesive tape being of a size to cover the second layer of foamed resin.

15. The process of claim 7 including, during assembly of the decorative layer on the lower mold, depositing the decorative layer in a manner to allow it to conform to the lower mold surface and ridge by gravity to thereby provide, adjacent to and inside the ridge, an expansion zone for the panel when it is compressed by the upper mold section, the resulting decorative layer surface approaching the ridges being a convex curve.

16. The process of claim 8 including, during assembly of the decorative layer on the lower mold, depositing the decorative layer in a manner to allow it to conform to the lower mold surface and ridge by gravity to thereby provide, adjacent to and inside the ridge, an expansion zone for the panel when it is compressed by the upper mold section, the resulting decorative layer surface approaching the ridges being a convex curve.

17. The process of claim 9 including, during assembly of the decorative layer on the lower mold, depositing the decorative layer in a manner to allow it to conform to the lower mold surface and ridge by gravity to thereby provide, adjacent to and inside the ridge, an expansion zone for the panel when it is compressed by the upper mold section, the resulting decorative layer surface approaching the ridges being a convex curve.

18. The process of claim 10 including, during assembly of the decorative layer on the lower mold, depositing the decorative layer in a manner to allow it to conform to the lower mold surface and ridge by gravity to thereby provide, adjacent t and inside the ridge, an expansion zone for the panel when it is compressed by the upper mold section, the resulting decorative layer surface approaching the ridges being a convex curve.

19. The process of claim 11 including, during assembly of the decorative layer on the lower mold, depositing the decorative layer in a manner to allow it to conform to the lower mold surface and ridge by gravity to thereby provide, adjacent to and inside the ridge, an expansion zone for the panel when it is compressed by the upper mold section, the resulting decorative layer surface approaching the ridges being a convex curve.

20. The process of claim 12 including, during assembly of the decorative layer on the lower mold, depositing the decorative layer in a manner to allow it to conform to the lower mold surface and ridge by gravity to thereby provide, adjacent to and inside the ridge, an expansion zone for the panel when it is compressed by the upper mold section, the resulting decorative layer surface approaching the ridges being a convex curve.

* * * * *